Oct. 28, 1969   H. A. MITCHELL ET AL   3,474,664
ULTRASONIC GAUGING METHOD AND APPARATUS

Filed April 18, 1966   3 Sheets-Sheet 1

INVENTORS
HUGH A. MITCHELL
WILLEM A.M. GRANDIA
BY
Elliott & Pastoriza
ATTORNEYS

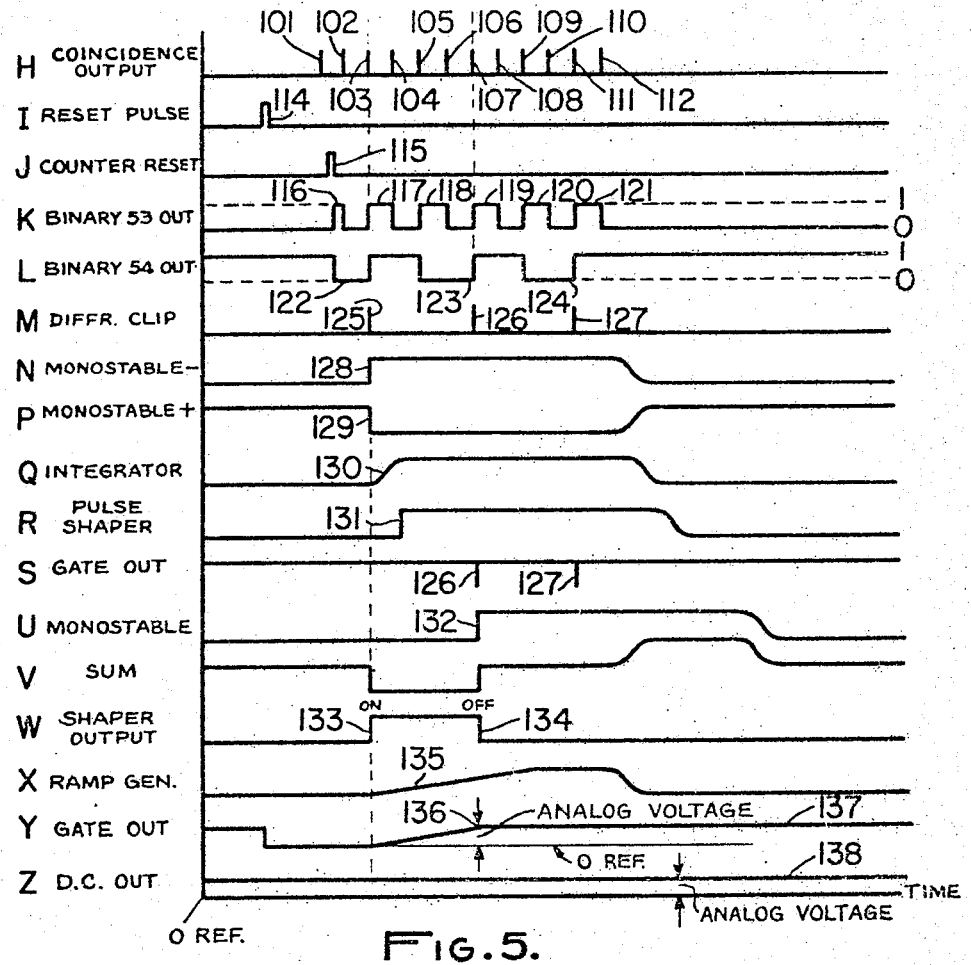

United States Patent Office 3,474,664
Patented Oct. 28, 1969

3,474,664
ULTRASONIC GAUGING METHOD
AND APPARATUS
Hugh A. Mitchell, North Hollywood, and Willem A. M.
Grandia, Canoga Park, Calif., assignors to Magnaflux
Corporation, Chicago, Ill.
Filed Apr. 18, 1966, Ser. No. 543,386
Int. Cl. G01n 9/24
U.S. Cl. 73—67.9                            10 Claims

ABSTRACT OF THE DISCLOSURE

Ultrasonic gauging system including means for measuring and indicating an elapsed time at least twice as long as the elapsed time between the transmission of a pulse into one surface of a meterial and the receipt of a corresponding echo pulse at said one surface after reflection from an opposite surface. Important features relate to the use of a tuned circuit to improve accuracy and to discriminate against interference signals, to the use of digital counter means to develop the time interval to be measured, and to gating means for applying selected signals to the measuring means in a manner to improve accuracy.

---

This invention relates to a method and apparatus for gauging the thickness of material and more particularly to a system for gauging the thickness of relatively thin material by means of ultrasonic sound echoes.

Thickness measurements employing ultrasonic means are presently known in the art. One class of such known systems operates on the principle of impacting the material with an ultrasonic sound pulse and making time measurements between resulting echoes from the top and bottom surfaces of the material. These systems are thus analogous, to some extent, to a sonar system wherein distances are measured by determining the time interval between a generated pulse and its echo. They are useful wherein it is desired to make measurements from only one side without physically contacting the material.

Generally, the ultrasonic pulse-echo principle for measuring thicknesses is satisfactory when the thickness of the material is of sufficient value that proper resolution of the echo pulses can be realized. It will be appreciated, however, that an ultrasonic pulse, even when traveling through a medium other than air, has an appreciable pulse width, and any echoes from the material involved will also have an appreciable pulse width. For very thin material, however, the time interval between returning echo pulses from the top and bottom sufaces becomes so small that the pulse widths of the echoes overlap resulting in considerable difficulty in resolving the pulses.

Compounding the foregoing problem is the fact that in solid materials, different types of sound waves are generated upon being impacted by a major sound pulse. Thus, for example, the sound pulse, when striking the top surface of the medium can travel through the medium in the form of a longitudinal wave and reflect from the bottom surface of the medium back to the top surface and thence back to the pulse generator. Also, there can be generated a transverse wave which travels through the material at a different acoustic velocity from the longitudinal wave with the result that the echoes from the bottom surface are displaced in time relative to the echoes of the longitudinal wave. The echo information received by a receiver will thus include a plurality of additional pulses having different positions in time with respect to the longitudinal wave pulses, and, again, these pulses, coupled with the pulse width problem, results in received information with which presently available resolving methods are incapable of unscrambling.

As a consequence of the foregoing, there has been a serious limitation on the thinness of material with which pulse-echo type ultrasonic measuring equipment can be used.

Another limiting factor on the usefulness of presently available pulse-echo systems results from the difficulty of providing an accurate output signal constituting a function of the short time interval between successive echo pulses when the material is thin. Thus, even assuming that it is possible to discriminate between proper successive pulses to provide a time interval constituting a function of the thickness of the material, there is then encountered the problem of how to convert this time interval into a meaningful output signal. Because of the extremely short time interval involved with thin material, it is unfeasible, with presently available pulse generators or counters, to provide an accurate output signal between two successive echo pulses. In other words, if the output signal information is in the form of a number of output pulses proportional to the time interval involved, there are not presently available pulse generators capable of providing a sufficient number of pulses within the time interval involved. If the output information is in the form of an analog signal derived from a ramp voltage generated during the time interval, the same inaccuracies result since the slope of the ramp must be relatively steep to fit within the time interval. With a steep slope involved, it is difficult to accurately correlate a given voltage with a given point at the end of the time interval.

With all of the foregoing considerations in mind, it is a primary object of the present invention to provide a vastly improved method and apparatus for gauging the thickness of materials by ultrasonic means operating on the pulse-echo principles wherein the above problems are largely overcome, all to the end that extremely thin material heretofore not measurable with pulse-echo equipment can be accurately gauged.

More particularly, it is an object to provide novel circuitry in a pulse-echo ultrasonic gauging system wherein echo pulses may be more accurately resolved and more accurately measured, notwithstanding the presence of finite pulse width of the echo pulses and the presence of transverse sound waves or other spurious signals, all to the end, again, that extremely thin material may be properly gauged.

Another important object is to provide an ultrasonic system incorporating unique measuring and indicating means capable of providing an accurate analog output signal which will serve to indicate the thickness of a material even though the time interval between successive echo pulses from the top and bottom surfaces of the material may be too short to enable any recognizable signal to be generated during such time interval.

Still another object in conjunction with the foregoing object is to provide a unique measuring means which will provide an output signal accurately indicating the thickness of material independently of the transit time involved of various signals through the circuitry.

A more general object is to provide an improved method and apparatus for gauging the thickness of materials capable of providing a continuous indication of thickness while the material is moving under the system without physical contact therewith and from one side only.

A particular object of the invention is to provide a method and apparatus for gauging material by ultrasonic means accurate to within plus or minus one-tenth of a mil.

Briefly, these and many other objects and advantages of this invention are attained by providing a pulse-echo gauging system for transmitting an ultrasonic sound pulse to a material and receiving multiple echo pulses from the top and bottom surfaces of the material. In accord with one feature of the invention, the circuitry includes a converting and counting means for generating on and off signals defining a time duration constituting an integral multiple of the time interval between two successive ones of the echo pulses. This time duration, in turn, is converted by novel indicating means into an output analog signal constituting a function of the time duration and, thus, a direct integral multiple of the time interval between successive echo pulses. With such an arrangement, it will be evident that a totaling of a given number of successive time intervals between echo pulses from the top and bottom surfaces takes place. As a consequence, any small variation in the time interval as a result of a small thickness variation will be multiplied by the number of time intervals in the time duration and thus enable a more accurate measurement of such variation.

Further, it will be evident that the time duration between the on and off signals will be sufficiently greater as established by the particular integral multiple involved such that digital or analog type equipment will have an opportunity to operate and provide a digital or analog output signal which will indicate the time duration involved.

In accord with another important feature of this invention, the echo pulses are arranged to pass through a filter circuit provided in the receiver and adapted to be tuned manually or automatically to a frequency having a period equal or close to the time interval between two successive ones of the echo pulses. Under these conditions, when the echo pulses are passed to the filter circuit, the circuit will only pass that frequency corresponding to the frequency defined by the period of the time interval to provide an output sine wave. The period of this output sine wave thus defines accurately the time interval between successive echo pulses. More importantly, the filtering aspect of the circuit wherein only an output sine wave of a period corresponding to the time interval between proper longitudinal wave echoes results, serves to eliminate from the output of the receiver spurious signals or transverse wave echoes occurring in different time positions.

The apparatus of the invention further contemplates additional unique circuitry for rendering the system accurate and reliable, particularly when extremely thin material is to be gauged.

A better understanding of the method and apparatus of this invention will be had by now referring to one embodiment of the system as illustrated in the accompanying drawings, in which:

FIGURE 5 illustrates some of the wave forms of FIGURE 4 together with additional wave forms on a reduced time scale as would appear at the correspondingly lettered points in the block diagram of FIGURE 2; and FIGURE 6 is a table useful in explaining the operation of certain of the circuit components of FIGURE 2.

Figure 1:
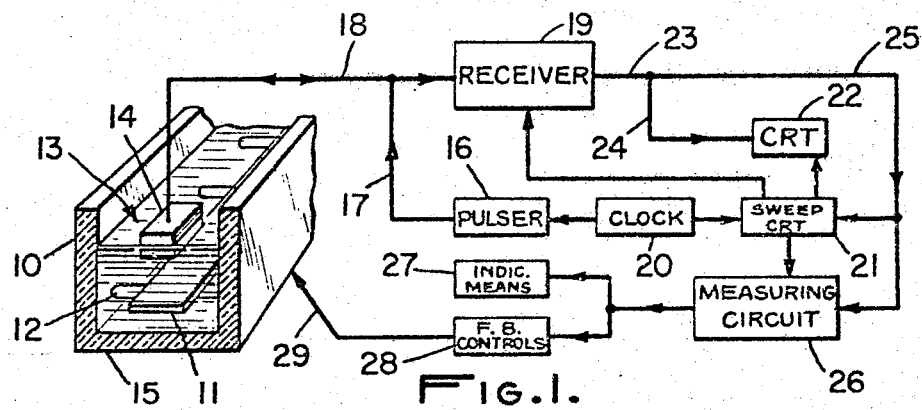
FIGURE 1 is a basic block diagram, partly schematic in form, illustrating the system for gauging material ultrasonically.

Referring first to FIGURE 1, there is shown an elongated container 10 within which a material 11, such as rolled steel or titanium, is shown mounted on rollers 12 for movement through the container. The container is filled with a liquid such as water 13 to provide an acoustic coupling between an ultrasonic pulse generator 14 and the upper surface of the material 11.

The arrangement of FIGURE 1 is such that the thickness of the material 11 may be continuously gauged as it moves under the ultrasonic pulse generator 14 without physical contact with the generator and from only one side of the material. It will be understood, of course, that the showing in FIGURE 1 is purely schematic and that the principles of the invention are applicable to simple static type thickness measurements. It is preferable to use water in order to provide a non-contact coupling medium with consistent coupling. The system is operable however with the generator directly on the surface of the material using a thin water or oil film for complete coupling. In the case of static contact measurements, a Lucite block may be used between the generator and material to effect consistent coupling.

It will be noted in FIGURE 1 that the ultrasonic pulse generator 14 is triggered or pulsed by a suitable pulser circuit 16 through leads 17 and 18 to generate an impacting ultrasonic pulse of sound energy to the top surface of the material 11. The echoes of this pulse from the top and bottom surfaces are received in the same transmitted unit 14 and transduced in the conventional manner to electrical pulses passing back along the same line 18 to a receiver 19. The receiver 19 will also receive the electrical pulsing signal from the pulser 16 initiating the first generated ultrasonic impacting pulse from the generator 14.

As indicated in FIGURE 1, the pulser is controlled by a basic clock circuit 20 which essentially controls the pulse repetition rate of the system as well as provides synchronizing signals for the other portions of the circuit. In this respect, the clock circuit 20 provides synchronizing signals to a sweep circuit 21 which includes a sweep generator for operating a cathode ray tube 22 in conjunction with received signals from the receiver 19 through line 23 and branch line 24. The cathode ray tube 22 will thus provide a visual display of the signals on the line 23 derived from the receiver 19. The signals from the output 23 of the receiver also pass through a line 25 to a measuring circuit 26. The sweep circuit also includes a synchronizing tracking gate generator connected to the receiver 19 as well as the measuring circuit 26.

The output of the measuring circuit 26 connects to an indicating means shown at 27 which may provide a digital or analog output signal constituting a function of a time duration in turn constituting an integral multiple of the time interval between successive echo pulses between the top and bottom surfaces of the material 11 and thus a function of the thickness of the material. Also, the output from the measuring circuit 26 may be passed to a feedback control 28 which will provide a servo type control signal to automatically control the thickness of the material 11 in accordance with set limits in the feedback control. This feedback type control is indicated by the arrow 29 and, as an example, in the case of a rolling operation, if the thickness of the material exceeds a given specification, the rollers can be adjusted to provide for a thinner material automatically in accordance with the information on the line 29 from the feedback control 28.

In the overall general operation of the circuit of FIGURE 1, the pulser 16 will trigger generation of an impact ultrasonic sound pulse from the sound pulse generator 14. This sound pulse will travel down and strike the top surface of the material 11 and will also pass through the material to strike the bottom surface. The echo signals reflected from the top and bottom surfaces will be detected in the generator 14 and converted to electrical signals passed to the receiver 19 by way of the lead 18.

As will be described in greater detail in connection with FIGURE 2, the receiver 19 includes unique circuitry which provides, in one embodiment of the invention, an output sine wave on the lines 23 and 25 whose period defines a time interval corresponding to the time interval between two successive echo pulses. In another embodiment of the invention, the receiver 19 may simply provide a series of pulses on line 25 separated by time intervals corresponding to the time interval between successive echo pulses. In this latter embodiment, the materials involved are relatively thick and the unique circuitry in the receiver of the first embodiment is not necessary.

The measuring circuit 26 receives the sine wave from the receiver 19 or a series of pulses as the case may be. Essentially, the measuring circuit includes converting and counting means for providing an on and off signal separated by a time duration which corresponds to an integral multiple of the time interval between two successive echo pulses. By this means, a digital output may be provided on the indicating means 27 or, alternatively, an analog output signal may be provided which is a function of the time duration. By providing a time duration in this manner, there results far greater accuracy and ease in providing an output signal which accurately reflects the thickness of the material since any variations in such thickness will be inherent in each of the time intervals making up the duration and thus multiplied in the measured time duration.

In addition to the foregoing basic operation of the circuit of FIGURE 1, the various receiver and measuring circuit blocks 19 and 26 as well as the sweep circuit 21 include further unique circuits which contribute towards the overall accuracy of the system and enable the various objects of gauging extremely thin materials to be realized. The complete circuit components, including components providing these unique features, will now be described in conjunction with FIGURE 2.

Figure 2:
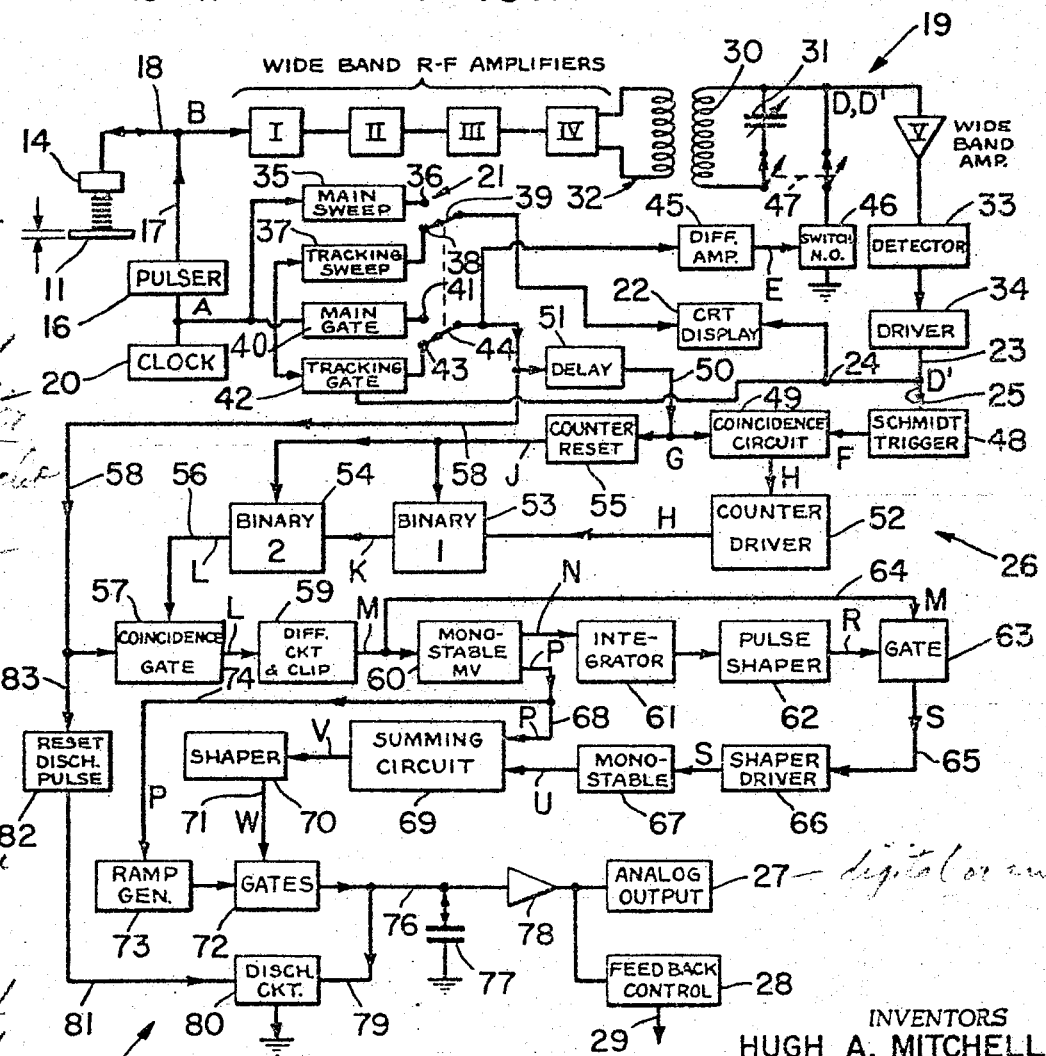
FIGURE 2 is a detailed block diagram of the circuit of FIGURE 1.

Starting at the upper left-hand corner of FIGURE 2, there is reproduced schematically the material 11, the thickness T of which it is desired to measure. Also shown is the ultrasonic pulse generating means 14, the pulser 16, and clock 20 described in conjunction with FIGURE 1.

Considering first the principal components making up the receiver, the echo pulses received on the line 18 pass into the receiver as described which includes first, second, third and fourth wideband R-F amplifier stages designated I, II, III, and IV. The secondary coil 30 of the output coupling transformer for stage IV constitutes, together with a shunting condenser 31, a tuned circuit designated generally by the arrow 32. The output of the tuned circuit 32, in turn, connects through a wide band amplifier V to a detector 33 and thence to a driver 34 to provide the output on the lines 23 and 25 for the measuring circuit as described in FIGURE 1. As reproduced in FIGURE 2, there is shown the lead 24 from the output of the receiver lead 23 to the cathode ray tube display circuit 22.

It will be noted that the sweep circuit, designated generally by the numeral 21 as reproduced in FIGURE 2, includes a main sweep generator 35 synchronized by the clock 20 and providing a conventional cathode ray sweep control to a terminal 36. This sweep generator also connects to a tracking sweep generator 37, the output of which provides a tracking sweep on another terminal 38. A switch arm 39 is arranged to be moved between the terminals 36 and 38 and a display on the cathode ray tube 27 is provided when the switch 39 is either on the terminal 36 or 38.

Also included as part of the sweep circuit 21 is a main gate generator 40 having an output terminal 41 and triggered from the clock 20. A tracking gate generator 42 in turn is tied to the tracking sweep generator 37 and has an output terminal 43. A second switch arm 44 ganged to the arm 39 is arranged to contact either terminal 41 or 43 simultaneously with the contacting of terminals 36 and 38 by the switch arm 39.

The tracking gate generator is triggered by the top surface echo pulse from the line 24 at the output of the receiver. The tracking gate from the tracking gate generator passes through switch arms 44 when it is on terminal 43, to a differentiating and amplifying circuit 45 and thence to a normally open electronic switch 46 to close this switch. When the switch 46 is closed, it serves to ground the filter circuit 32 through normally closed ganged switches 47. The switches 47 are arranged to be opened if it is desired to remove the effects of the filter circuit from the main receiver. The purpose for the foregoing use of the tracking gate and switch controls will become more evident as the description proceeds.

Referring now to the middle right-hand portion of FIGURE 2, the measuring circuit, designated generally by the numeral 26 in FIGURES 1 and 2, includes a Schmitt trigger circuit 48 receiving the output from the receiver-driver 34 from the lead 25. The output of the Schmitt trigger connects to one input of a coincident circuit 49. The other input terminal of the coincident circuit receives a delayed tracking gate through lead 50 provided by a delay circuit 51 connected to the output of the switch arm 44. The coincident circuit 49 will provide an output signal upon coincidence of signals from the Schmitt trigger 48 and the delayed tracking gate from the lead 50. This output from the coincident circuit triggers a binary counter driver 52, the output of which connects to a first binary counting circuit 53. The binary counting circuit 53 is connected in series to a second binary counter 54. Only two counting circuits are shown, but it is to be understood that additional binary counters may be provided.

The delayed tracking gate 51 on the lead 50 passing to the coincident circuit 49 also passes to a counter reset pulse generating circuit 55 to provide suitable resetting pulses to the first and second binary circuits 53 and 54, as shown. The output of the second binary counter passes on the line 56 to the first input of a coincident gate 57. This coincident gate 57 receives on its second input the original tracking gate from the tracking gate generator 42 through lead 58. The output from the coincident gate 57 is differentiated and clipped in a differentiating and clipping circuit 59 to provide differentiated pulses for triggering a first mono-stable multi-vibrator 60. The output wave form from one side of the mono-stable multi-vibrator 60 is passed to an integrating circuit 61 and a pulse shaper 62 to provide a slightly delayed output wave form passed to a gate 63. The gate 63 is opened by the signal from the pulse shaper 62 to pass the differentiated signals from block 59 along a line 64 connecting to the gate.

The output of the gate 63 passes through a lead 65 to a shaper-driver circuit 66 in turn triggering a second side of the first mono-stable multi-vibrator 60 on lead 68 and the output of the second mono-stable multi-vibrator 67 are passed into a summing circuit 69.

From the summing circuit, the resulting sum signal passes through a shaper 70 and thence through lead 71 to a gate 72. The gate 72 constitutes part of the indicating means of this invention designated generally by the numeral 27 in FIGURES 1 and 2. This indicating includes a ramp generator 73 triggered by the inverse or second side output from the mono-stable multi-vibrator 60 on the lead 74. The gate 72 is provided essentially with on and off signals which serve to open and close the gate, these on and off signals being provided from the shaper 70. The gate 72 will thus pass a portion of the ramp voltage provided by the ramp generator 73 on an output line 76 to a storage means in the form of a storage condenser 77 which will hold the ramp voltage at a given voltage level. The voltage on the storage means 77 is amplified in a D.C. Darlington type amplifier 78 and provides an analog output voltage signal. The signal to 27 may also be employed to control the feedback circuit 28.

A suitable discharge circuit for discharging periodically the storage means 77 is provided by lead 79 passing to a grounding switch 80 triggered through lead 81 from a reset pulse generator 82 in turn triggered by the tracking gate on the lead 58 through lead 83.

With the above description of the basic components and their inter-connections making up the system of this invention in mind, the overall operation of the entire system will now be described. For this purpose, reference is had to FIGURES 3, 4, and 5 which illustrate lettered wave forms occurring at the correspondingly lettered points in the block diagram of FIGURE 2.

Figure 3:
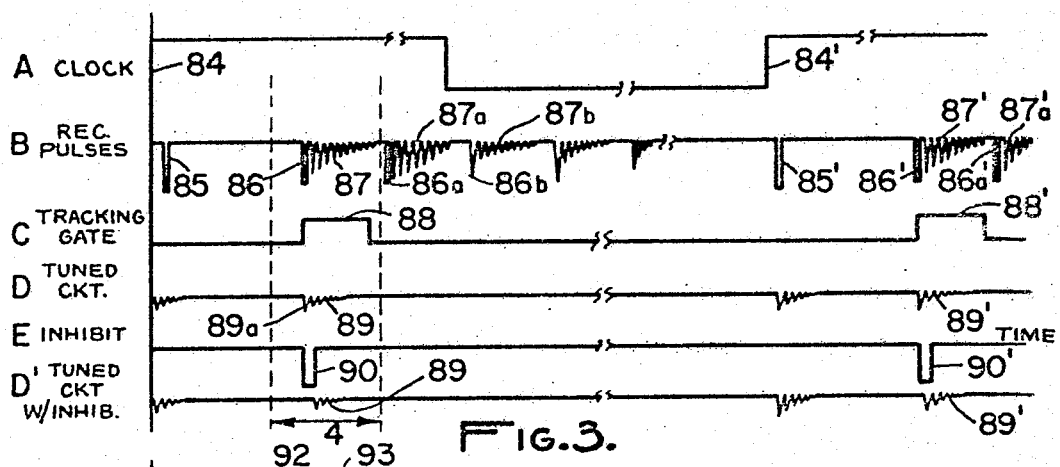
FIGURE 3 illustrates a series of wave forms indicated by letters and corresponding qualitatively to the wave forms that would occur at the correspondingly lettered points in the block diagram of FIGURE 2.

Referring first to wave form A in FIGURE 3 and the corresponding point A in the block diagram of FIGURE 2, it will be noted that the wave form from the clock generator 20 is in the form of a square wave having leading edges 84 and 84'. The frequency of this square wave defines the pulse repetition rate of the system and may, for example, be in the range of 250 to 2000 cycles per second. Thus, each time that the square wave 84 starts with its leading edge from its minimum to its maximum value, it triggers the pulser 16 which in turn pulses the ultrasonic pulse generator 14 to transmit an initial impact pulse to the material 11. Since, in FIGURE 3, the frequency of 250 cycles per second is extremely low compared to the frequencies involved in the following wave forms, the square wave has been shown as broken to indicate that relative to the subsequent wave forms, it would extend considerably to the right along the time axis.

The electrical signal corresponding to the impacting ultrasonic pulse and the echo pulses received from the top and bottom surfaces of the material 11 in the lead 18 of FIGURE 2 and received in the wide band R-F amplifiers are indicated by the wave forms B. In this wave form, the pulse 85 represents the impact pulse and the pulse 86 represents the top surface reflected or echo pulse. The remaining pulses 87 following the top surface pulse 86 constitutes further echo pulses from the top and bottom surfaces as a consequence of re-reflection of the bottom surface echo within the material. The echoes shown at 86a and 87a, and 86b and 87b, for example result from re-reflection between the top surface of the material and the face of the pulse generator 14 through the coupling medium. It will be noted to the right in FIGURE 3 that the next impact pulse is designated 85' and for a pulse repetition rate of 250 cycles per second would occur 1/250 of a second later. The next top surface echo pulse is designated at 86' and so forth. In other words, the pattern simply repeats at the pulse repetition rate as triggered by the leading edges 84, 84' of the square wave from the clock control.

The tracking gate from the tracking gate generator 42 of FIGURE 2 is illustrated as wave form C wherein it will be noted that at the repetition rate, there is provided a gate defining a rectangular pulse 88 which encompasses only the top surface echo pulse and subsequent smaller echo pulses between the top and bottom surfaces of the material, this tracking gate serving to block subsequent echoes resulting from re-reflection of the top surface echo pulse 86. The tracking gate 88 is triggered by the top surface pulse 86 in each instance. Thus, this wave form is repeated again at 88' for the top surface pulse 86' 1/250 of a second later, as shown.

Wave form D represents the output of the tuned filter circuit 32 in the absence of the inhibit means control constituting the differentiating and amplifying circuit 45 and normally opened switch 46 described in FIGURE 2. This output is indicated as a wave portion, a part of which designated 89 constitutes a fairly accurate sine wave. The repetition of the operation of the tuned circuit is again illustrated at 89'.

Wave form E represents the output of the differentiating and amplifying circuit 45 of the inhibitor circuit described in FIGURE 2 which is in the form of an inhibiting gate 90 again occurring at the pulse repetition rate as indicated at 90' and being triggered by the initiation of the tracking gate 88. The output of the tuned filter circuit 32 with the inhibitor circuit operating is illustrated at D' wherein it will be noted that only the sine wave portion 89 is passed, the inhibiting gate 90 blocking a first distorted portion 89a resulting from the top surface pulse 86.

Figure 4:
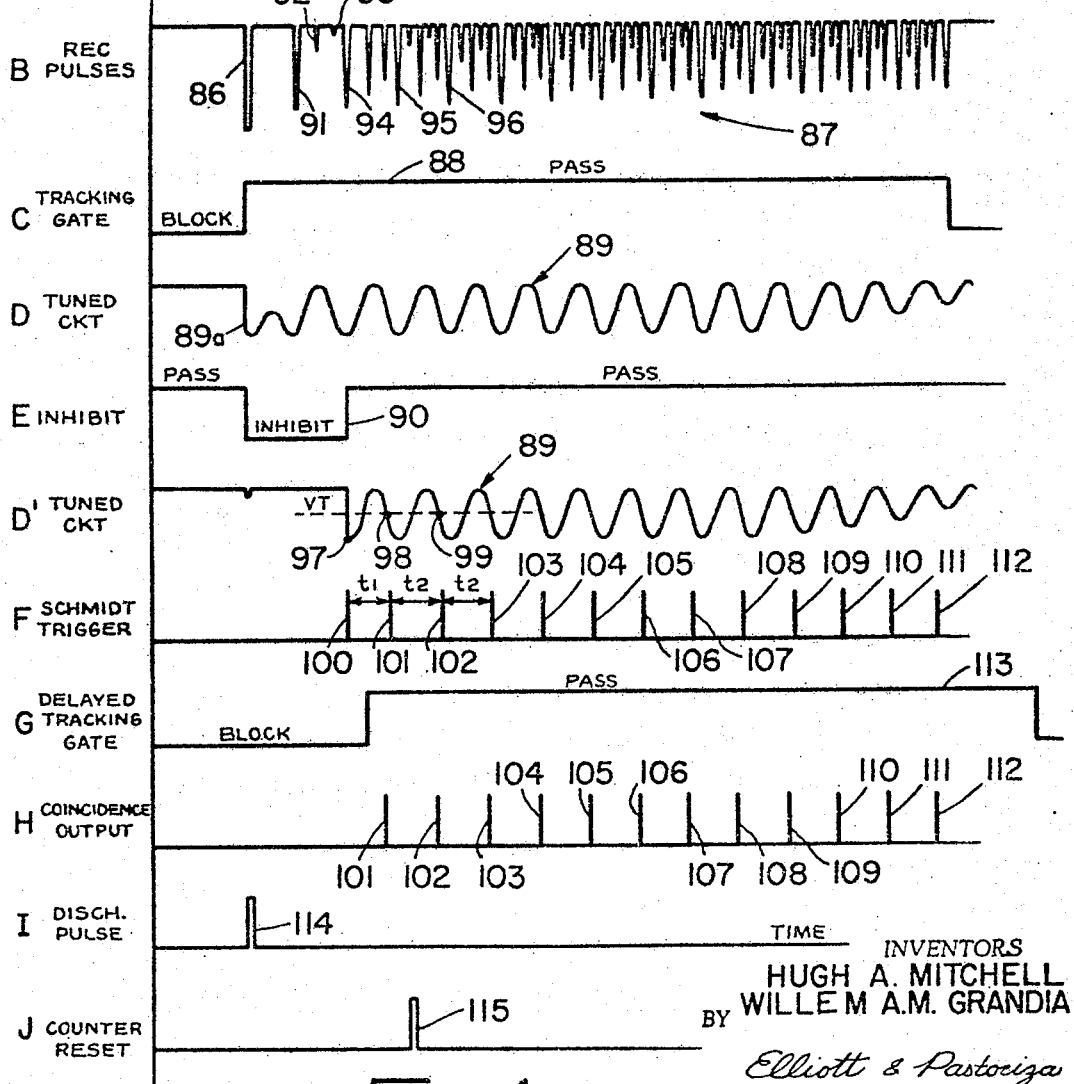
FIGURE 4 illustrates some of the wave forms of FIGURE 3 together with additional wave forms on a greatly expanded time scale corresponding to the time interval designated by the double-headed arrow 4 of FIGURE 3 and wherein, again, letters designating the wave forms correspond to letters in FIGURE 2 at those points at which the wave forms occur.

The purpose for the inhibiting circuit will be better understood by now referring to the enlarged expanded time scale wave forms illustrated in FIGURE 4. Thus, referring again to wave form B, as illustrated in FIGURE 4, it will be noted that after the top surface echo pulse 86, there results a bottom surface echo pulse 91 followed in time by smaller pulses 92 and 93. When the bottom echo pulse 91 returns to the top surface, only a portion of the energy passes through the top surface back to the transducer, the remainder is reflected back to the bottom surface and continues reflecting back and fourth in the material to produce echoes 94, 95, 96. The time intervals between the successive echo pulses 91, 94, 95, and 96 are determined by the acoustic speed of sound in the particular material being gauged since these pulses represent echo signals from the top and bottom surfaces. The pulses spaced between the top and bottom surface pulses such as indicated at 92 and 93 are also top and bottom reflections from transverse traveling sound waves in the material which travel at different acoustic velocities. Because of the out-of-time phase relationship resulting from the different acoustic velocities, these pulses, upon re-reflection between the top and bottom surfaces, at some times will coincide with each other and thus tend to build up an amplitude. Also coupled with the problem of these transverse echo signals are the pulse widths of the signals themselves which tend to overlap when the material is extremely thin and thus provide a relatively confusing pulse echo pattern. This pulse width problem is under exaggerated in the wave forms of FIGURE 3 in order to illustrate clearly the phenomenon of the spurious echo pulses resulting from the transverse traveling of the sound waves in the material.

In FIGURE 4, the blocking characteristics of the tracking gate C are indicated wherein it will be evident that the main impact signal is blocked along with the subsequent echoes illustrated in FIGURE 3 so that only the top surface echo pulse 86 and the pulses 91, 92, 93, 94, and so forth are passed. As stated, this tracking gate is triggered by the top surface pulse 86 and passes the initial tuned circuit output, indicated by wave form D which initial is somewhat distorted as indicated at 89a.

It is to avoid this transient operation of the tuned filter circuit by the top surface echo pulse 86 that the inhibiting circuit described in FIGURE 2 is provided and, in this respect, it will be clear from FIGURE 4 that the inhibiting gate 90 serves to block or inhibit oscillation of the tuned filter circuit until after the top surface echo pulse 86 and the first bottom surface pulse 91 have occurred.

The resulting tuned filter circuit output wave form D' is indicated at 89 in FIGURE 4 wherein the initial distortion of the sine wave output has been eliminated. Thus, with reference to FIGURE 2, it will be clear that the tracking gate signal from the tracking gate generator 42 is passed through the switch arm 44 to the differentiating and amplifying circuit 45 which generates the delay or inhibit wave 90, thereby closing the normally open switch 46 and grounding the tuned filter circuit. This inhibiting gate 90 is reproduced in FIGURE 4 as wave form E.

With the inhibiting circuit in operation, the output of the tuned filter circuit as indicated at D' is illustrated in greater detail in FIGURE 4. It is this output which is in the form of a sine wave 89 and which is fed into the Schmitt trigger 48 after passing through the wide band amplifier V, detector 33, and driver 34 of FIGURE 2.

The Schmitt trigger of FIGURE 2 is set to trigger at a voltage level indicated at VT for the tuned filter circuit sine wave output 89 in FIGURE 4. Since it is not certain when the inhibit gate 90 will remove the shorting of the tuned filter circuit to ground, the first portion of the sine wave from the tuned filter circuit passed to the Schmitt trigger may be at a point in the sine wave form different from the point defined by the triggering voltage VT.

As a specific example, the inhibit gate 90 is shown removing ground from the tuned filter circuit at a point in time at which the sine wave happens to be at its lower maximum value, as indicated at 97. The Schmitt trigger is set to generate a pulse at any voltage below the level VT by the sine wave when passing from upper to lower maximum values such as at the points 98 and 99 for the remaining portion of the sine wave 89. The first output pulse from the Schmitt trigger indicated at 100 in wave form F will thus be closer to the subsequent trigger pulses designated 101 through 112, respectively, as indicated by the time interval $t1$. Thus, while the time intervals between successive trigger pulses correspond exactly to the point of the sine wave as indicated at $t2$, the time interval $t1$ may be less than $t2$ because of the uncertainty, as described, when the inhibit is removed from the tuned circuit. It is therefore desirable to eliminate the first trigger pulse from the Schmitt trigger from the remaining portion of the circuit.

It is towards this end that the delay circuit 51 for the tracking gate generator 42 is provided in the circuit of FIGURE 2. This delay provides a delay tracking gate on the lead 50 to the coincidence circuit 49. This delayed gate is indicated at 113 by the wave form G in FIGURE 4 and the delay is such that the first Schmitt trigger 100 will be eliminated from the output of the coincidence circuit.

As described, the coincidence circuit is connected to receive the output trigger pulses 100 through 112, but can only pass the pulses when actuated by the delayed tracking gate so that the only pulses in the output wave form H from the coincidence circuit are the pulses 101 through 112.

The output of the counter driver 52 constitutes a series of pulses in corresponding time positions as the pulses 101 through 112 and are represented by the same numerals, the counter driver 52 simply shaping and amplifying these trigger signals to provide narrow pulses, all of the same amplitude as indicated.

The next wave form in FIGURE 4 illustrates a pulse 114 which serves as a discharge pulse in the indicating means portion of the circuit. This pulse is generated in response to initiation of the tracking gate 88 in wave form C and its function will be described subsequently.

Wave form J illustrates a counter reset pulse 115 which is derived from the delayed tracking wave form G, the reset pulse 115 constituting an output from the counter reset circuit providing a small delay from the initiation of the delayed tracking gate G. This reset pulse 115 is necessary to reset the first and second binary counters 53 and 54 described in the block diagram of FIGURE 2.

Referring now to FIGURE 5, the wave forms H, I, and J are repeated on a reduced time scale. In FIGURE 5, there are illustrated wave forms K and L which serve to graphically illustrate the states of the binary counters 53 and 54, respectively. When the wave forms are at the up level indicated by the numeral 1, the first binary counter 53, shown by the wave form K, is in its reset state, this resetting being effected by the reset pulse 115. When the second binary counter 54 is in its up position designated 1 in graph L, it is in the opposite state from its reset state. The first binary is thus in its reset state at the times indicated by the numerals 116, 117, 118, 119, 120, and 121 while the second binary is at its reset state at the times indicated by the numerals 122, 123, and 124.

FIGURE 6 illustrates a simple table showing the states of the first and second binary counters. With reference both to FIGURES 5 and 6, it will be evident that before the reset pulse 115, the first binary counter 53 is in its 0 level or state and therefore upon reception of the reset pulse 115, it will switch to its 1 state as indicated at 116 in FIGURE 5 and at the head of the table in FIGURE 6. The second binary counter 54 is at its 1 state, before the reset pulse 115, so that when the reset pulse 115 is received, it will switch to its reset or 0 state as indicated at 122 in FIGURE 5 and at the head of the table in FIGURE 6. It should be understood that the particular states that the counters are in prior to the reset pulse 115 may be either the 0 state or the 1 state and if the counter is already in its reset state, the reset pulse 115 will have no effect.

Consider the next sequence of events: As indicated in the time plots of FIGURE 5, the first pulse to hit the first binary counter 53 after the reset pulse 115 has been received is pulse 102 shown in wave form H of FIGURE 5. Reception of this pulse by the first binary counter will change its state from 1 to 0 as indicated in the table of FIGURE 6. The binary counter 54, on the other hand, is not triggered when the binary counter 53 changes its state from 1 to 0 but is only triggered when the binary counter 53 changes its state from 0 to 1. Therefore, the binary counter 54 will remain in the 0 state.

When the next trigger pulse 103 is received in the binary counter 53, it will change the binary counter 53 state from 0 to 1 and this will give rise to a signal passed to the series connected binary counter 54 to change its state from 0 to 1. When the second binary counter 54 changes from 0 to 1, it will generate a pulse which is indicated as pulse 125 in wave form M.

When pulse 104 is received, the first binary counter will change from 1 back to 0 and in changing from 1 to 0, this will have no effect on the second binary counter so that it will remain in state 1 after the pulse 104 is received. The next pulse 105 will change the first binary counter from 0 to 1 and this operation switches the second binary counter from 1 to 0. However, since the second binary counter only provides an output pulse when changing from 0 to 1, there will be no output pulse recorded when the second binary counter changes from 1 to 0. The next pulse 106 will change the first binary counter from 1 back to 0 and this will have no effect on the second binary counter. However, when pulse 107 is received, it will change the first binary counter from 0 to 1 which operation will trigger the second binary counter from 0 to 1 and result in the generation of pulse 126.

From the foregoing, it will be evident that the first binary counter 53 simply alternates in states in response to each received trigger pulse whereas the second binary counter 54 changes its state every other pulse. Graphs K and L depict this situation, and it will be evident that the output pulses derived from the second binary, as indicated at 125, 126, and 127, only occur when the second binary is changing from its 0 to its 1 state. The actual pulses 125, 126, and 127 are derived from the second binary counter 54 through the coincidence and differentiating blocks 57 and 59 of FIGURE 2. Thus, with reference once again to FIGURE 2, the wave output from the second binary is passed through the coincident gate 57, which is opened to pass the pulse by the tracking gate on the line 58, and the differentiation of the wave form L passed through the differentiating clipping circuit 59 gives rise to the pulses 125, 126, and 127 on the upside of the wave.

It will be evident that the time duration between, for example, the output pulse 125 and the output pulse 126, shown in wave form M of FIGURE 5 constitutes a length of time equal to four times the time interval between the trigger pulses, such as between the trigger pulses 103 and 104 or between 104 and 105. In other words, there are provided output pulses 125 and 126 which define a time duration constituting an integral multiple of the time interval between successive trigger pulses, which in turn define the time interval between successive echo pulses as derived from the tuned circuit sine wave.

The pulses 125, 126 and 127 from the differentiating and clipping circuit pass into the first mono-stable multi-vibrator 60 of FIGURE 2 to give rise to the wave form N in FIGURE 5 which is taken from one side of the mono-stable multi-vibrator and has a leading edge 128 coincident in time with pulse 125. The other side of the multi-vibrator at lead 68 provides the wave form P having a coincident leading edge 129 which wave form is the inverse of N.

The N wave form is passed through the integrator circuit 61 to provide the wave form Q having a sloping leading edge 130. The wave form Q of FIGURE 5 is then passed through the pulse shaper 62 of FIGURE 2 to provide the wave form R which is simply a squared up version of the integrated wave providing a wave similar to the wave form N but delayed somewhat in time, all as indicated by the leading edge 131.

The wave form R from the pulse shaper turns on the gate 63 which will pass only the pulses 126 and 127 from lead 64 as shown at S since the first pulse 125 from the differentiating and clipping circuit is blocked by the delayed wave form R.

The pulse 126 after passing through the lead 65 and the shaper-driver circuit 66 triggers the second mono-stable multi-vibrator 67 giving rise to the wave form U having a leading edge 132 coincident with the pulse 126. This wave form U, together with the wave form P from the inverse side of the mono-stable multi-vibrator 60 are passed into the summing circuit 69 to provide a sum wave form output V. This wave form V, in passing through the shaper 70, is inverted to provide the wave form W.

It will be noted with respect to the wave form W that the leading edge 133 of the square wave coincides exactly with the pulse 125 from the differentiating and clipping circuit which is derived from the output of the second binary circuit and this leading edge may be deemed an "on" pulse or "on" signal. The trailing edge 134 of the square wave, on the other hand, coincides exactly with the next pulse 126 from the differentiating and clipping circuit and may be considered an "off" signal. Thus, the width of the square wave corresponds exactly to the time duration between the pulses 125 and 126 which, in turn, corresponds to exactly four times the time interval between successive trigger pulses as depicted in wave form H.

The on and off signals defined by 133 and 134 of the wave form W pass through the lead 71 to control the gate 72 in FIGURE 2 which, in turn, passes the ramp voltage provided by the ramp generator 73. The ramp voltage shown at X in FIGURE 5 is initiated by the leading edge 129 of the wave form P from the mono-stable multi-vibrator and rises steadily with time as indicated at 135. At the time of the off portion 134 of the square wave W, the gate is closed so that the output from the gate circuit is as indicated in wave form Y of FIGURE 5. Thus, the ramp voltage is gated between the points 133 and 134 so that only the slope portion terminating at the point 136 is passed, and the ramp voltage value at this point will remain at this level at the time of the off portion 134 of the square wave. The ramp generator itself is reset by the trailing edge of wave form P as shown in wave form X.

The storage condenser 77 cooperates with the output of the gate circuit to store the ramp voltage and hold it at the value as indicated at 137 in the gate output wave form Y.

The voltage 137 will be held on the condenser until the condenser 77 is discharged. The discharging of the condenser is effected by the reset pulse 114 shown in FIGURE 5 and derived from the initiation of the tracking gate 88 as described in FIGURE 4. It should be understood that the storage condenser will hold the output voltage of the ramp generator at the cutoff point defined by the off pulse for several minutes in the absence of the discharge pulse 114. Thus, the voltage value on the condenser be essentially constant for the pulse repetition period, which is a relatively long period of time since the discharge pulse applied to the discharge circuit to discharge the condenser will only occur at the pulse repetition rate.

As a consequence of the foregoing, It is possible to simply filter out the variations in the gate output signal by means of a suitable filter capacitance in the output circuit of the Darlington amplifier 78 to provide an analog output voltage such as indicated at 138 in output wave form Z of FIGURE 5.

Assuming that the ramp voltage increases linearly with time, it will be immediately evident that the magnitude of the D.C. output voltage from the amplifier 78 will be a function of the duration of time defined between the on and off signals 133 and 134 and thus will represent the sum of four time intervals between successive echo pulses.

As stated heretofore, there is a unique advantage gained in providing the particular system as described for indicating the output. Thus, the on and off signals are separated by a time duration constituting an integral multiple of the time interval between successive echo pulses and therefore this time interval is considerably longer than would normally be the simple time interval between successive pulses. In extremely thin material, the time interval between successive pulses is so small that it would ordinarily not be possible to even obtain an analog voltage by employing the trigger signals themselves to gate a ramp generator or to turn on and off a pulse generator and provide a number of pulses. However, by using the relatively longer duration of time defined by the on and off portions of the square wave W in FIGURE 5, it is possible to obtain easily an analog output voltage which is a function of the time duration, or alternatively, to generate by a separate pulse generator a series of pulses, the number of which is proportional to the time duration and which may be counted by an ordinary counter to provide a simple digital readout.

Another important consideration with respect to the foregoing is that the circuit as described avoids any errors as a consequence of transit time of the pulses in passing through the counter circuits. This is achieved by the use of the two mono-stable multivibrators 60 and 67 with the summing circuit 69 to define the on and off signals 133 and 134. Thus, once the individual series of electrical pulses represented by the trigger pulses in wave form H are passed to the first binary counter, the same having been properly reset, the remaining portion of the counting and indicating means of the circuit is wholly independent of any further echo pulses or other disturbances.

In addition, the accuracy of the system is not only greatly increased as a consequence of providing a time duration which is an integral multiple of several of the time intervals representing the length of time between successive echo pulses, but the provision of the filter circuit tuned to a frequency close to the suspected frequency of the desired echo pulses from the top and bottom surfaces results in a passing by the tuned filter circuit of a clean sine wave output having a period corresponding exactly to the time interval between the desired echo pulses to be measured. There are thus eliminated all of the spurious pulses that occur from transverse sound waves, merging of pulse widths, and the like.

It should be understood, of course, that the tuning of the tuned circuit described in the receiver circuit can be effected automatically by providing a simple tracking means controlled when the output signal extends beyond certain limits. In other words, assuming that the tuned circuit is properly tuned by means of the variable condenser 31 shown in FIGURE 2 to a frequency close to the frequency expected of the echo pulses for a known thickness of the material, there will be produced a given analog voltage at the output indicator 27. If the thickness of the material should gradually vary such as to become thinner or thicker, the analog output voltage would correspondingly vary and a portion of this voltage change may be employed to control an automatic means for returning the condenser 31 so as to track the new frequency of the echo pulses. In addition, a sweep frequency circuit may be used to automatically lock on such automatic tracking means to the particular frequency established by the time interval period.

Further, it should be understood that while only two binary circuits have been shown, it is possible to add a further binary circuit or even a fourth binary circuit, thereby enabling the provision of on and off signals separated by a time duration corresponding to any number of the triggering pulses up to 16.

The circuit of FIGURE 2 is designed such that the tuned filter circuit 32 may be removed by simply opening the ganged switches 47 to their dotted line positions. For example, if relatively thick material is being gauged, the time interval between the echo pulses from the top and bottom surfaces would be sufficiently great that there will be no confusion as a consequence of pulse width or even extraneous pulses so that the signals themselves may be directly counted rather than necessitating the use of the tuned filter circuit.

With the circuit as described, thicknesses less than 10 mils have been measured with less than 1/100 mil error.

It will thus be seen that all of the various objects of this invention are fully realized by the method and apparatus as described.

What is claimed is:

1. An ultrasonic gauging method for determining the thickness of a given material, comprising the steps of: transmitting an ultrasonic sound pulse to said material; receiving echo pulses from the top and bottom surfaces of said material; tuning a circuit to a given frequency having a period close to the time interval between two successive ones of said echo pulses; passing said echo pulses to said tuned circuit whereby said tuned circuit resonates only in response to those echo pulses occurring at a frequency closest to said given frequency to provide an output sine wave; and providing an output signal constituting a function of the frequency of said output sine wave.

2. In ultrasonic gauging apparatus, pulse transmitting and receiving means for transmitting ultrasonic pulses into a material and for receiving echo pulses from said material, measuring means connected to said pulse transmitting and receiving means and arranged to develop an on signal and an off signal with the time duration between said on signal and said off signal being directly proportional to and at least twice as long as the elapsed time between transmission of a pulse into one surface of said material and the receipt of a corresponding echo pulse at said one surface after reflection from an opposite surface of said material, and indicating means connected to said measuring means and arranged to indicate the elapsed time between said on signal and said off signal.

3. In ultrasonic gauging apparatus as defined in claim 2, said indicating means including a ramp generator connected to said measuring means to respond to said on signal and to develop a ramp voltage signal increasing with time, and storage means responsive to said off signal to hold said ramp voltage signal at its level at the time of said off signal, and means connected to said storage means for indicating the magnitude of the level of said ramp voltage at the time of said off signal.

4. In ultrasonic gauging apparatus as defined in claim 2, said pulse transmitting and receiving means being arranged to receive echo signals developed from repeated reflections between said one surface and said opposite surface of said material, and said measuring means including first signal means arranged to develop said on signal in response to one pulse at said one surface and second signal means arranged to develop said off signal in response to a pulse developed at said one surface after a plural number of consecutive reflections from said opposite surface, the time between said on and off signals being an integer multiple of the elapsed time between the transmission of a pulse into said one surface and the receipt of a corresponding echo pulse at said one surface after reflection from said opposite surface.

5. In ultrasonic gauging apparatus as defined in claim 4, said second signal means including digital counter means operative to develop said off signal upon application of a certain number of pulses thereto, and means connecting said pulse transmitting and receiving means to said counter means to apply pulses subsequent to said one pulse to said counter means.

6. In ultrasonic gauging apparatus as defined in claim 5, gating means connected between said transmitting and receiving means and said second signal means to apply to said counter means only those pulses developed at said one surface following receipt of a first pulse reflected from said opposite surface after transmission of a pulse into said one surface.

7. In ultrasonic gauging apparatus as defined in claim 5, said digital counter means including a plurality of binary counters connected in series, means for applying said pulses subsequent to said one pulse to the first one of said binary counters, and means connected to the final one of said binary counters to develop said off signal.

8. In ultrasonic gauging apparatus as defined in claim 4, a tuned circuit connected between said transmitting and receiving means and said measuring means and tuned to resonate at a frequency having a period approximately equal to the elapsed time between the transmission of a pulse into said one surface and the receipt of a corresponding echo pulse at said one surface after reflection from said opposite surface, said tuned circuit being operative to develop an output wave of substantially sinusoidal form having a period defining said elapsed time, said first signal means being arranged to develop said on signal at a certain point at one cycle of said output wave, and said second signal means being arranged to develop said off signal at a corresponding point of a subsequent cycle of said output wave.

9. In ultrasonic gauging apparatus as defined in claim 8, said measuring means including a trigger circuit connected to said tuned circuit for developing a pulse at a certain point of each cycle of said output wave, said second signal means including digital counter means operative to develop said off signal upon application of a certain number of pulses thereto, said first signal means being connected to said trigger circuit to develop said on signal in response to a certain pulse from said trigger circuit, and means connecting said trigger circuit and said counter circuit to apply pulses thereto subsequent to said certain pulse.

10. In ultrasonic gauging apparatus as defined in claim 8, gating means connected between said transmitting and receiving means and said tuned circuit for applying to said tuned circuit only those pulses developed at said one surface following receipt of a first pulse reflected from said opposite surface after transmission of a pulse into said one surface.

References Cited

UNITED STATES PATENTS

| 2,672,392 | 3/1954 | Caples et al. | 73—67.9 XR |
| 3,169,393 | 2/1965 | Stebbins | 73—67.9 |

RICHARD C. QUEISSER, Primary Examiner
JOHN R. FLANAGAN, Assistant Examiner